(12) United States Patent
Umeda et al.

(10) Patent No.: US 9,797,640 B2
(45) Date of Patent: Oct. 24, 2017

(54) REFRIGERATING APPARATUS AND CORRESPONDING CONTROL DEVICE

(71) Applicant: Daikin Applied Americas Inc., Minneapolis, MN (US)

(72) Inventors: Nobuhiro Umeda, Fishersville, VA (US); Takatoshi Takigawa, St Louis Park, MN (US); Fumiaki Onodera, Minnetonka, MN (US); Nobutoshi Kozono, Osaka (JP)

(73) Assignee: DAIKIN APPLIED AMERICAS INC., Minneapolis, MN (US)

( * ) Notice: Subject to any disclaimer, the term of this patent is extended or adjusted under 35 U.S.C. 154(b) by 729 days.

(21) Appl. No.: 14/211,485

(22) Filed: Mar. 14, 2014

(65) Prior Publication Data
US 2014/0260385 A1    Sep. 18, 2014

Related U.S. Application Data

(60) Provisional application No. 61/790,596, filed on Mar. 15, 2013.

(51) Int. Cl.
*F25D 17/00* (2006.01)
*F25B 49/02* (2006.01)
(Continued)

(52) U.S. Cl.
CPC ............. *F25B 49/02* (2013.01); *F04D 27/00* (2013.01); *F25B 1/053* (2013.01); *F25B 49/022* (2013.01);
(Continued)

(58) Field of Classification Search
CPC ........ F25B 49/02; F25B 1/053; F25B 49/022; F25B 1/10; F25B 25/005; F25B 2339/047; F25B 2400/13; F25B 2400/23; F25B 2600/0253; F25B 2600/2513; F25B 2700/195; F25B 2700/197; F25B 2700/21162; F25B 2700/21171; F04D 27/00; Y02B 30/7411
See application file for complete search history.

(56) References Cited

U.S. PATENT DOCUMENTS 3,350,897 A * 11/1967 Plaster ................ F04D 27/0246
415/147
3,447,335 A *  6/1969 Wheeler .................. F25B 1/10
62/151
(Continued)

FOREIGN PATENT DOCUMENTS

EP           0 186 332 A1 *  7/1986

*Primary Examiner* — Ljiljana Ciric
(74) *Attorney, Agent, or Firm* — Global IP Counselors, LLP (57) ABSTRACT

A refrigerating apparatus includes a centrifugal compressor, a capacity control mechanism that controls a capacity of the compressor by changing an opening degree of the capacity control mechanism, an expansion mechanism that reduces a pressure of a refrigerant, and a controller. The controller calculates an opening degree of the expansion mechanism using compressor capacity as one of a plurality of indices of change in load. The compressor capacity is obtained from a current rotation number of the compressor, an opening degree of the capacity control mechanism, and a divergence rate of a current operation head from a surge region.

15 Claims, 6 Drawing Sheets

(51) Int. Cl.
- *F04D 27/00* (2006.01)
- *F25B 1/053* (2006.01)
- *F25B 1/10* (2006.01)
- *F25B 25/00* (2006.01)

(52) U.S. Cl.
CPC .............. *F25B 1/10* (2013.01); *F25B 25/005* (2013.01); *F25B 2339/047* (2013.01); *F25B 2400/13* (2013.01); *F25B 2400/23* (2013.01); *F25B 2600/0253* (2013.01); *F25B 2600/2513* (2013.01); *F25B 2700/195* (2013.01); *F25B 2700/197* (2013.01); *F25B 2700/2109* (2013.01); *F25B 2700/21161* (2013.01); *F25B 2700/21162* (2013.01); *F25B 2700/21171* (2013.01); *Y02B 30/741* (2013.01)

(56) References Cited

U.S. PATENT DOCUMENTS

| | | | |
|---|---|---|---|
| 3,495,418 A * | 2/1970 | Kapich | F25B 1/10 415/27 |
| 3,555,844 A * | 1/1971 | Fleckenstein et al. | F04D 27/0207 62/217 |
| 4,248,055 A * | 2/1981 | Day, III | F04D 27/0207 62/196.3 |
| 4,546,618 A * | 10/1985 | Kountz | F25B 1/053 417/20 |
| 4,581,900 A * | 4/1986 | Lowe | F04D 27/001 415/17 |
| 4,646,530 A * | 3/1987 | Huenniger | F04D 27/0253 62/175 |
| 5,894,736 A * | 4/1999 | Beaverson | F04D 27/001 62/129 |
| 6,318,101 B1 | 11/2001 | Pham et al. | |
| 8,132,420 B2 | 3/2012 | Okoren et al. | |
| 2006/0147301 A1* | 7/2006 | Ueda | F04D 27/0207 415/144 |
| 2010/0269524 A1* | 10/2010 | Welch | F25B 49/022 62/175 |
| 2011/0048046 A1* | 3/2011 | Sommer | F04D 17/12 62/228.1 |
| 2011/0093133 A1* | 4/2011 | Turney | F25B 1/053 700/300 |
| 2012/0048387 A1* | 3/2012 | Galeotti | F04D 27/001 137/14 |
| 2013/0000339 A1* | 1/2013 | Shimazu | F25B 31/004 62/192 |
| 2013/0104584 A1* | 5/2013 | Takizawa | F25B 1/10 62/228.1 |
| 2013/0319020 A1* | 12/2013 | Neeld | F25D 11/003 62/89 |
| 2014/0260388 A1* | 9/2014 | Umeda | F25B 49/022 62/208 |
| 2015/0056059 A1* | 2/2015 | Crane | F25B 1/053 415/1 |
| 2015/0219110 A1* | 8/2015 | De | F04D 27/0246 415/1 |
| 2017/0009775 A1* | 1/2017 | Arnou | F04D 17/12 |

\* cited by examiner

REFRIGERATING APPARATUS AND CORRESPONDING CONTROL DEVICE

CROSS-REFERENCE TO RELATED APPLICATIONS

This application claims the benefit of U.S. Provisional Application No. 61/790,596, filed on Mar. 15, 2013. U.S. Provisional Application No. 61/790,596 is hereby incorporated herein by reference.

BACKGROUND

Field of the Invention

The present invention generally relates to a refrigerating apparatus and a control device for a refrigerating machine.

Background Information

U.S. Pat. No. 8,132,420 B2 to Okoren et al. is directed to a VARIABLE EVAPORATOR WATER FLOW COMPENSATION FOR LEAVING WATER TEMPERATURE CONTROL.

U.S. Pat. No. 6,318,101 B1 to Pham et al. is directed to a METHOD FOR CONTROLLING AN ELECTRONIC EXPANSION VALVE BASED ON COOLER PINCH AND DISCHARGE SUPERHEAT.

SUMMARY

In recent years, in order to meet a need for energy saving, comprehensive system efficiency has been required including not only operation efficiency of a refrigerating machine itself but also peripheral equipment such as water pump and the like.

For example, when the flow rate of water is decreased corresponding to the load status by inverter control of a water pump so as to respond to decrease in load at actual facilities of the user, large power reduction can be achieved in the entire system depending on the operation conditions of a chiller. Further, it can be expected that the system efficiency will be improved more by making both the flow rate of chilled water and the flow rate of cooling water variable at the same time.

When the flow rate of water is variable, not only a capacity control of a compressor to follow a transient change when the flow rate of water is changed, but also a flow control of a refrigerant in response to the capacity control of the compressor, that is, a control of an expansion mechanism are expected to maintain a stable and efficient operation of the chiller. Also, a function to detect a deviation of the flow rate of water from the design flow rate range is expected to protect the equipments of the chiller, when the flow rate of water is variably controlled.

The object of the present invention is to provide a refrigerating apparatus and a control device for a refrigerating machine that achieve stable and efficient operation even in a case where the flow rates of chilled water and cooling water are made variable at the same time, and have an inexpensive quantitative detector for a case where the variable flow rates of chilled water and cooling water reach abnormal levels.

(Means of Achieving the Object) An opening degree of an expansion mechanism is calculated and an estimation of a current flow rate of chilled water and cooling water is achieved, using pseudo chilled water inlet and outlet temperature difference derived from compressor capacity obtained from factors which are a current rotation number of the compressor, an opening degree of a capacity control mechanism, and a divergence rate of a current operation head from a surge region.

BRIEF DESCRIPTION OF THE DRAWINGS

Referring now to the attached drawings which form a part of this original disclosure.

DETAILED DESCRIPTION OF EMBODIMENT(S)

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

In the embodiments, following words means as described below.

IGV is abbreviation for Inlet Guide Vane. This mechanism is generally used for adjusting performance of a centrifugal (or turbo) compressor. IGV is coupled to a gas intake port of the compressor.

DDC is an abbreviation for Discharge Diffuser Control. This mechanism is for adjusting performance of a centrifugal (or turbo) compressor and expanding operating region (avoiding surge). Diffuser refers to a passage in which refrigerant gas, which has been accelerated by a compressor impeller, converts dynamic pressure (speed) into static pressure (so-called pressure).

IPLV is an abbreviation for Integrated Part Load Value. IPLV is a performance indicator set by AHRI (Air-Conditioning, Heating and Refrigeration Institute) for a chiller when the chiller is assumed to operate throughout a year (including partial load operation).

TR is an abbreviation for TonsR (American refrigeration ton). Refrigeration ton is often used with large size chillers for indicating the chiller's capacity.

Head refers to pressure rising property of the compressor. In the embodiments, head has a unit of energy (KJ/kg), and used as a theoretical pressure rising property when gas is compressed under adiabatic (isentropic) state.

Surge refers to violent vibration of entire gas, which circulates in the compressor, connection pipes and heat exchangers, along a direction of gas flow, which is caused when the pressure rising property of the centrifugal compressor temporarily falls below the required operation pressure difference (=condensation pressure−evaporation pressure) of the heat exchangers of the chiller. Since this vibration can cause damages to the internal parts of the compressor and decrease reliability of the chiller, the avoidance control should be promptly performed or the chiller should be stopped immediately once the surge occurs.

Figure 1A:
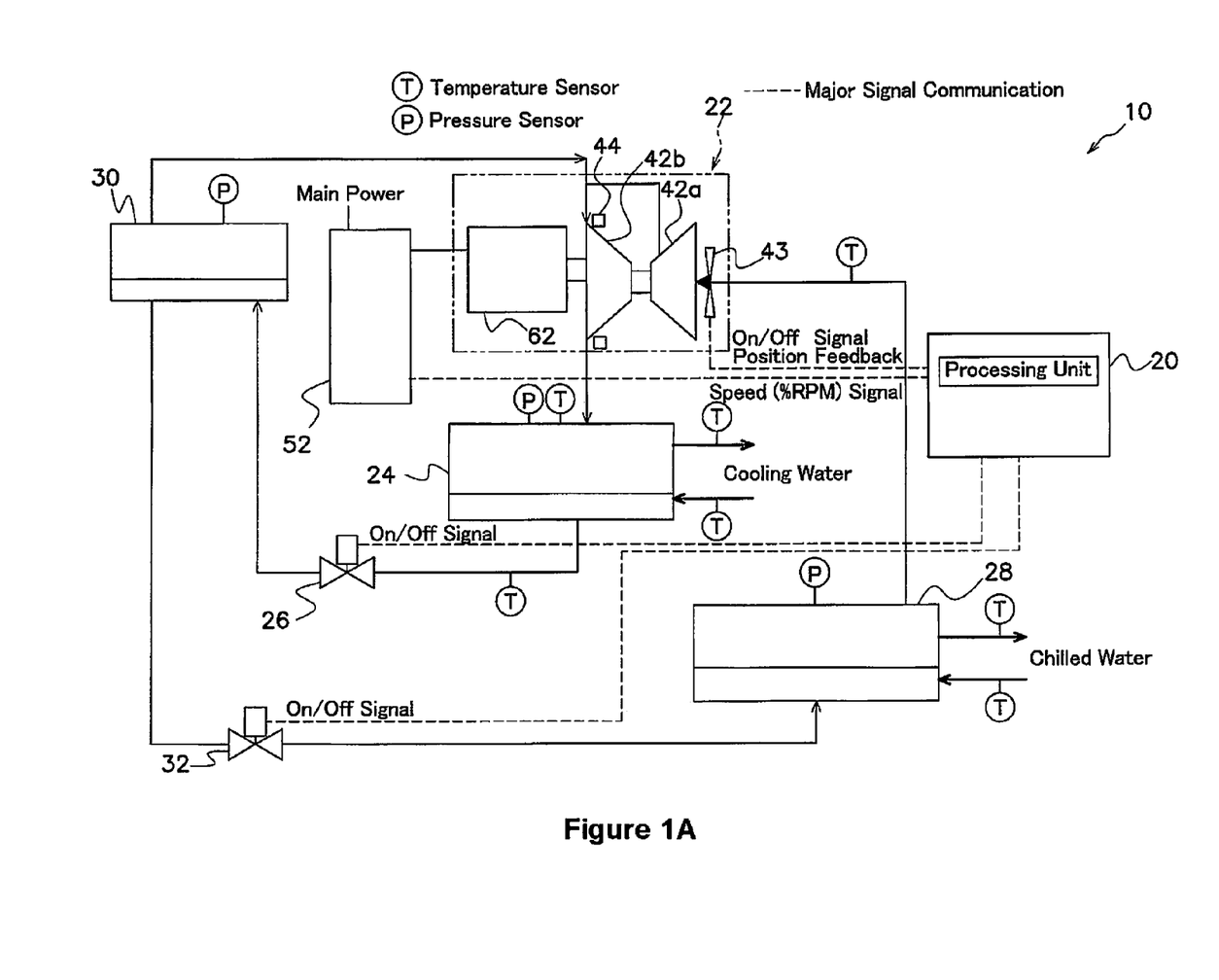
FIG. 1A illustrates a centrifugal 2-stage chiller in accordance with a first embodiment.
Figure 1B:
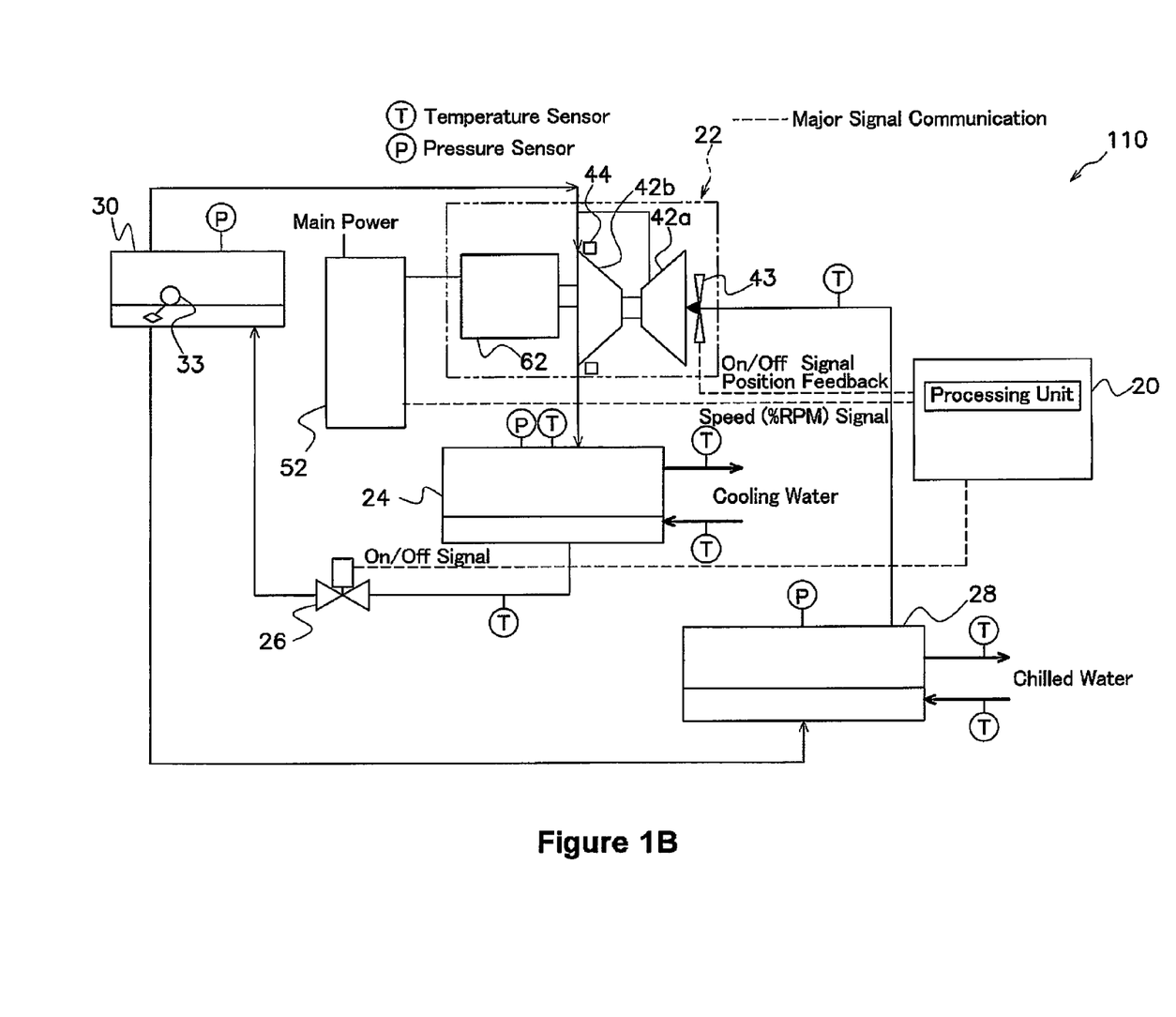
FIG. 1B illustrates a centrifugal 2-stage chiller in accordance with a second embodiment.
Figure 2:
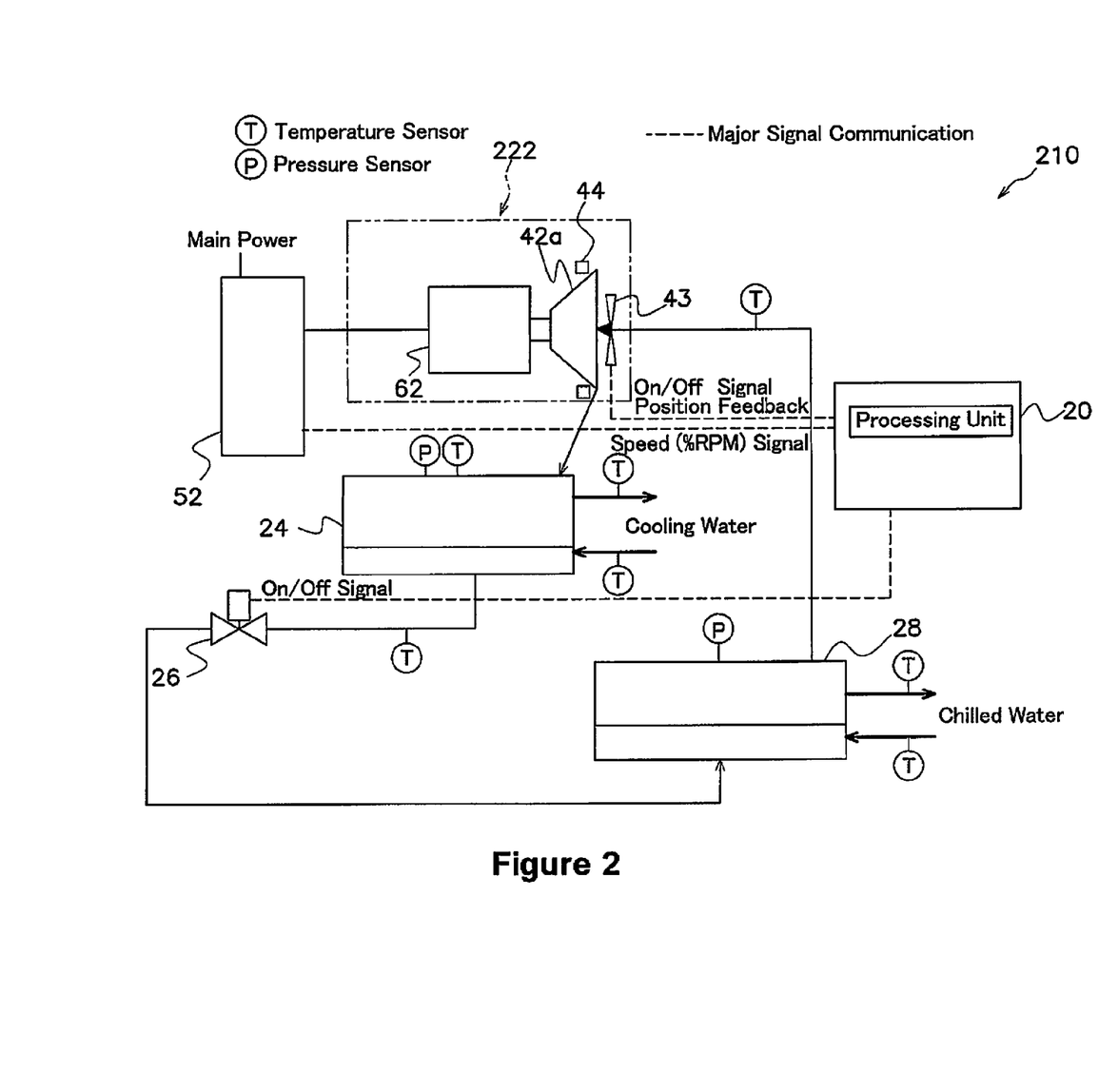
FIG. 2 illustrates a centrifugal single-stage chiller in accordance with a third embodiment.

FIG. 1A illustrates a centrifugal two-stage chiller 10, FIG. 1B illustrates a centrifugal two-stage chiller 110, and FIG. 2 illustrates a centrifugal single-stage chiller 210. The chillers 10, 110 and 210 are preferably water chillers that utilize cooling water and chilled water in a conventional manner.

The chiller 10 basically includes a chiller controller 20, a centrifugal compressor 22, a condenser 24, a $1^{st}$ (high stage) expansion valve 26 and an evaporator 28 interconnected to each other using piping in a conventional manner. An economizer 30 is interconnected between the condenser 24 and the evaporator 28 via piping in a conventional manner. The $1^{st}$ expansion valve 26 is connected in the piping between the condenser 24 and the economizer 30, while a $2^{nd}$ (low stage) expansion valve 32 is connected in the piping between the economizer 30 and the evaporator 28. The economizer 30 is further connected to the centrifugal compressor 22 to supply refrigerant gas from the economizer 30 to the centrifugal compressor 22.

The centrifugal compressor 22 includes a $1^{st}$ (low stage) compression mechanism 42a and a $2^{nd}$ (high stage) compression mechanism 42b. The output from the $1^{st}$ compression mechanism 42a is supplied to an inlet of the $2^{nd}$ compression mechanism 42b. The refrigerant gas from the economizer 30 is also supplied to the inlet of the $2^{nd}$ compression mechanism 42b. A Variable Frequency Drive (VFD) panel (an inverter control panel) 52 controls a drive motor 62, which drives the centrifugal compressor 22. An inlet guide vane 43 is disposed on an inlet side of the $1^{st}$ compression mechanism 42a. Discharge Diffuser Control System (DDC) 44 is disposed at the diffuser on the side of the $2^{nd}$ compression mechanism 42b of the centrifugal compressor 22.

The chiller controller 20 is communicably (e.g., electrically) connected to the $1^{st}$ and $2^{nd}$ expansion valves 26 and 32, the inlet guide vane 43 and the VFD panel 52. The chiller controller 20 can send and receive information from these parts. In addition, various pressure and temperature sensors are disposed in the chiller 10 and communicate with the chiller controller 20. The $1^{st}$ and $2^{nd}$ expansion valves 26 and 32 individually or in combination can be considered as an expansion mechanism in accordance with this disclosure. In the centrifugal chiller 10, the $1^{st}$ expansion valve 26 can be controlled in the same manner as is controlled in the centrifugal chillers 110 and 210. Alternatively, control of the $1^{st}$ and $2^{nd}$ expansion valves 26 and 32 can be coordinated by the chiller controller 20 to achieve the results disclosed herein. The control in which control/operation of the $1^{st}$ and $2^{nd}$ expansion valves 26 and 32 is coordinated is explained below.

The coordination between the $1^{st}$ and $2^{nd}$ expansion valves 26 and 32 is performed by controlling a ratio of the refrigerant flow amounts on the high stage side and the low stage side so that the mass balance and heat balance at the economizer 30 are balanced out. When the mass balance and heat balance at the economizer 30 are balanced out, the flow amount ratio on the high stage side and the low stage side can be calculated. The values used in this calculation can be calculated using the pressure sensor in the economizer 30 and the temperature sensor for liquid refrigerant at the outlet of the condenser 24.

Figure 3A:
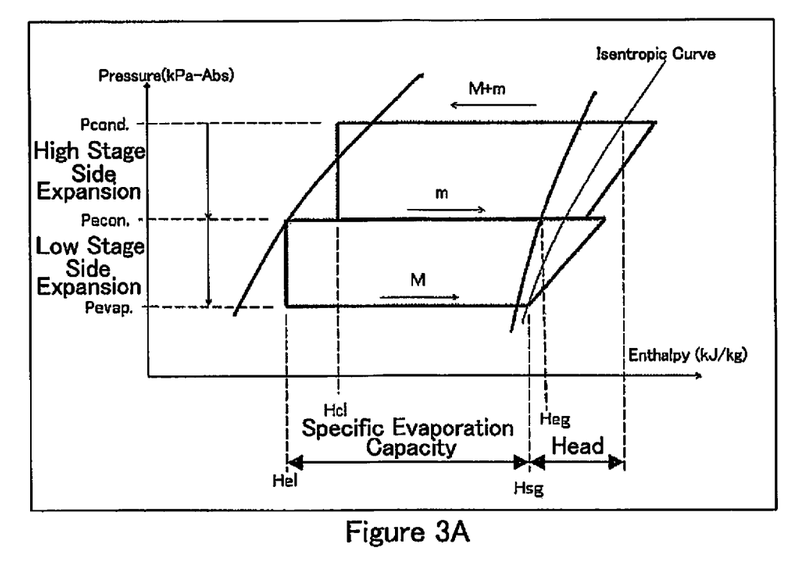
FIGS. 3A to 3C illustrate coordination control between the $1^{st}$ (high stage) and $2^{nd}$ (low stage) expansion valves in the centrifugal two-stage chiller in FIG. 1A.
Figure 3B:
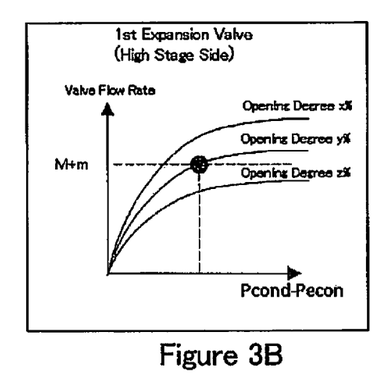
Figure 3C:
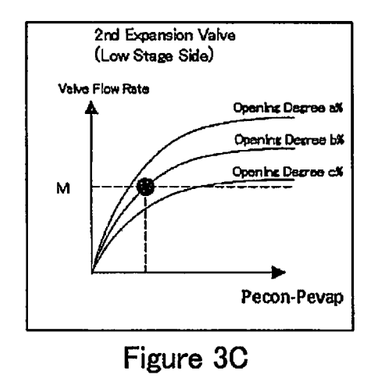

The control in which control/operation of the $1^{st}$ and $2^{nd}$ expansion valves 26 and 32 is coordinated is further explained in reference to FIGS. 3A, 3B, and 3C.

In the refrigerating cycle, the low stage side refrigerant flow rate M (refer to FIG. 3A) is calculated based on the property of the centrifugal compressor 22. Hel and Heg in FIG. 3A are saturated enthalpies, which can be calculated based on Pecon. (pressure at the economizer 30) in FIG. 3A. Hcl in FIG. 3A is an enthalpy of supercooled liquid, which can be calculated based on the fluid temperature at the outlet of the condenser 24. M+m (refrigerant flow rate discharged from the $2^{nd}$ compression mechanism 42b) is calculated based on the Equation 1 described later. Pcond. (pressure at the condenser 24), Pecon., and Pevap. (pressure at the evaporator 28) in FIG. 3A are known because pressure sensors are provided. In other words, high stage side pressure difference across the $1^{st}$ expansion valve 26 and low stage side pressure difference across the $2^{nd}$ expansion valve 32 are known. Properties (pressure difference-flow amount properties) of high stage side and low stage side expansion valves 26 and 32 are maintained within software. Opening degree of the high stage side $1^{st}$ expansion valve 26 is controlled so as to obtain flow rate M+m under the monitored high stage side pressure difference (refer to FIG. 3B). Opening degree of the low stage side $2^{nd}$ expansion valve 32 is controlled so as to obtain flow rate M under the monitored low stage side pressure difference (refer to FIG. 3C).

The following Equation 1 can be theoretically obtained based on the mass balance and heat balance at the economizer 30.

$$(M+m)/M = \{1+(Hcl-Hel)/(Heg-Hcl)\} \quad \text{(Equation 1)}$$

Equation 1 provides a flow amount ratio between the high stage side $1^{st}$ expansion valve 26 and the low stage side $2^{nd}$ expansion valve 32, and forms the basis of the coordination between the opening degrees of the $1^{st}$ and $2^{nd}$ expansion valves 26 and 32.

The centrifugal chiller 110 of FIG. 1B is identical to that of FIG. 1A, except the $2^{nd}$ expansion valve 32 is omitted. In the centrifugal chiller 110, mechanical float valve 33 without electric control is used in place of the $2^{nd}$ expansion valve 32. Therefore, the chiller controller 20 of the centrifugal chiller 110 only controls operation of the $1^{st}$ expansion valve 26 as expansion mechanism control, and the $1^{st}$ expansion valve 26 is considered as an expansion mechanism in accordance with this disclosure.

The centrifugal chiller 210 of FIG. 2 is identical to the centrifugal chiller 110 of FIG. 1B, except the economizer 30 is eliminated, and a modified centrifugal compressor 222 is provided in which the $2^{nd}$ compression mechanism 42b is eliminated (In comparison with the centrifugal chiller 10 in FIG. 1A, the expansion valve 32 is further eliminated). Therefore, the chiller controller 20 of the centrifugal chiller 210 only controls operation of the $1^{st}$ expansion valve 26 as expansion mechanism control, and the $1^{st}$ expansion valve 26 is considered as an expansion mechanism in accordance with this disclosure. Because the economizer 30 and the $2^{nd}$ compression mechanism 42b are eliminated, the piping is modified. Piping connects the condenser 24 to the evaporator 28, with the $1^{st}$ expansion valve 26 connected in the piping between the condenser 24 to the evaporator 28. In addition, because the economizer 30 and the $2^{nd}$ compression mechanism 42b are eliminated, output of the $1^{st}$ compression mechanism 42a is supplied to the condenser 24 (without merging with refrigerant gas from an economizer or passing through a $2^{nd}$ stage compression mechanism).

The parts of the centrifugal chillers 10, 110 and 210 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

The chiller controller 20 is an example of a controller of the refrigerating apparatus. Also the chiller controller 20 is an example of a control device for refrigerating machine. The chiller controller 20 preferably includes a microcomputer as a processing unit that controls the parts of the centrifugal chillers 10, 110 and 210 as disclosed herein. The chiller controller 20 preferably includes a computer readable medium (e.g., memory, hard disk, etc.) with an executable control program stored thereon, or is communicable with such a computer readable medium in order to execute the control program. The chiller controller 20 also preferably includes other conventional components such as an input interface circuit, an output interface circuit, and storage devices such as a ROM (Read Only Memory) device and a RAM (Random Access Memory) device to store programming, calculations and/or results. The microcomputer of the chiller controller 20 is programmed to control parts of the centrifugal chillers 10, 110 and 210 and/or receive information from parts of the centrifugal chillers 10, 110 and 210 as explained above. It will be apparent to those skilled in the art from this disclosure that the precise structure and algorithms for the chiller controller can be any combination of hardware and software that will carry out the functions of the present invention.

An opening degree of the expansion mechanism ($1^{st}$ and/or $2^{nd}$ expansion valves 26 and 32) is calculated by the chiller controller 20 using compressor capacity as one of indices of change in load. The compressor capacity is obtained from factors which are a current rotation number of the compressor (the centrifugal compressor 22 in the chiller 10, 110 or the centrifugal compressor 222 in the chiller 210), an opening degree of a capacity control mechanism (inlet guide vane 43), and a divergence rate of a current operation head from a surge region. The divergence rate is preferably a ratio between the driving head and a compressor surge head at that time. Preferably, at least the high stage side expansion mechanism is a target of calculation of the opening degree of the expansion mechanism. In other words, an opening degree of the $1^{st}$ expansion mechanism ($1^{st}$ expansion valve 26) is calculated for the centrifugal chillers 10, 110 and 210. However, in the chiller 10, operation of the $1^{st}$ expansion mechanism ($1^{st}$ expansion valve 26) can be coordinated with the $2^{nd}$ expansion mechanism ($2^{nd}$ expansion valve 32) as explained with reference to FIGS. 3A, 3B, and 3C.

Preferably, an actual control opening degree of the high stage side expansion mechanism ($1^{st}$ expansion valve 26) is corrected by a liquid-gas ratio by weight in the economizer 30 obtained from enthalpy of liquid at an outlet of the condenser 24 and saturated enthalpies of liquid and gas at the economizer 30.

Preferably, the low stage side expansion mechanism ($2^{nd}$ valve 32) is controlled by electrical operation, and an opening degree of the low stage side expansion mechanism ($2^{nd}$ expansion valve 32) is coordinated with a calculated opening degree of the high stage side expansion mechanism ($1^{st}$ expansion valve 26) as explained with reference to FIGS. 3A, 3B and 3C.

Alternatively, a mechanical float valve 33 in the economizer 30 is used as the low stage side expansion mechanism as shown in FIG. 1B. In such a case, the mechanical float valve 33 automatically opens/closes so that the fluid level in the economizer 30 is maintained at a prescribed level so as to be coordinated with operation/control of the high stage side expansion mechanism ($1^{st}$ expansion valve 26).

Pseudo chilled water inlet and outlet temperature difference is used for calculation of the opening degree of the expansion mechanism. Pseudo chilled water inlet and outlet temperature difference being obtained from the compressor capacity calculated above, evaporator capacity acquired from enthalpy information of the evaporator 28 and the economizer 30, and a standard design flow rate of chilled water (a standard design flow rate of chilled water supplied to the evaporator 28) of equipment. The pseudo chilled water inlet outlet temperature difference is a design temperature difference when a design standard chilled water amount flows in the evaporator of the chiller.

A current actual flow rate of chilled water is estimated by the chiller controller 20 by comparing pseudo chilled water inlet and outlet temperature difference with measured chilled water inlet and outlet temperature difference in actual operation. The pseudo chilled water inlet and outlet temperature difference is obtained from compressor capacity obtained based on a current rotation number of a compressor (the centrifugal compressor 22 in the chiller 10, 110 or the centrifugal compressor 222 in the chiller 210) and an opening degree of a capacity control mechanism (inlet guide vane 43), evaporator capacity obtained by inlet and outlet refrigerant circuit enthalpy difference of the evaporator 28, and a standard design flow rate of chilled water (a standard design flow rate of chilled water supplied to the evaporator 28) of equipment.

Preferably, the equipment (chiller 10, 110, 120) is stopped, an alarm is issued, or a request to increase or decrease a water amount (amount of water supplied to the evaporator 28) is made by the chiller controller 20 when the estimated actual flow rate of chilled water is outside a design acceptable flow rate range of chilled water.

Features of this disclosure are explained below.

Three cases (Condenser water delta temperature, Evaporator water delta temperature or Internally calculated pseudo evaporator water delta temperature (pseudo chilled water inlet and outlet temperature difference) are selectable as with capacity source factor for calculating the opening degree of expansion valve (refer to Table 1).

TABLE 1

| | | Expansion Valve Mode | |
|---|---|---|---|
| Mode | Capacity Source Factor | Source mainly to be checked | Description |
| Capacity | C_DT | Condenser water (Out-In) ΔT | Mainly work when |
| | E_DT | Evaporator water (In-Out) ΔT | Evaporator Leaving |
| | Internal | Internally calculated pseudo E_DT (PE_DT) | Water Temperature (ELWT) is under control. |

When expansion valve is controlled in capacity mode, the target opening degree of the expansion valve is calculated with Equation 2.

$$EXV\_POS = \{(553*EXV\_Cap - 48*\text{Lift Temperature})/100 + \text{Offset}\}*\text{Gain}/100 + Exv\_Os \quad \text{(Equation 2)}$$

In Equation 2, the symbols have meanings as follows. EXV_POS is a value obtained by multiplying the target opening degree (%) of the expansion valve by 10. EXV_Cap is a capacity source factor for calculating the opening degree of the expansion valve. The value obtained by multiplying the Condenser water delta temperature (C_DT in Table 1, the actual temperature difference of the cooling water between the condenser outlet and the condenser inlet) (deg F.) by 10 or the value obtained by multiplying the Evaporator water delta temperature (E_DT in Table 1, the actual temperature difference of the chilled water between the evaporator inlet and the evaporator outlet) (deg F.) by 10 can be used as EXV_Cap. When the capacity source factor is set as "Internal", calculated pseudo evaporator water delta temperature (PE_DT, pseudo chilled water inlet and outlet temperature difference) is used as EXV_Cap instead of the actual water DT (C_DT or E_DT). Lift temperature is a temperature difference (deg F.) between the corresponding saturation temperature of the refrigerant at the condenser and the corresponding saturation temperature of the refrigerant at the evaporator. Even if the opening degree of the expansion valve is unchanged, the amount of the refrigerant flowing in the expansion valve increases when the differential pressure across the expansion valve increases. By using Lift temperature as a state variable representing a differential pressure, the opening degree of the expansion valve obtained from the EXV_cap (capacity of the chiller) can be corrected. Offset is a predetermined constant. Gain is a value obtained by correcting a predetermined constant, which is used under the rated operation condition, according to the compressor capacity. EXV_OS is a variable determined according to the operation condition (supercooling degree of the refrigerant at the outlet of the condenser and superheating degree of the refrigerant at the inlet of the compressor).

Pseudo evaporator water delta temperature (PE_DT, pseudo chilled water inlet and outlet temperature difference) is unique concept which allows using existing electric expansion valve opening degree calculating logic, which usually uses actual water temperature difference as capacity, without actual water temperature information. Therefore, the pseudo evaporator water delta temperature is beneficial when the user of the chiller wants to perform a variable water flow control.

To use PE_DT in expansion valve opening degree calculation, "Internal" should be selected as "Capacity Control Source" in expansion valve control setting.

Calculation for obtaining PE_DT involves detail compressor performance characteristics calculation, like volumetric flow calculation, compressor head calculation and detail gas/liquid property calculation (density, enthalpy), so that it is effective when detail compressor mapping info (surge head and volumetric flow-head relationship) is well-known.

Figure 4:
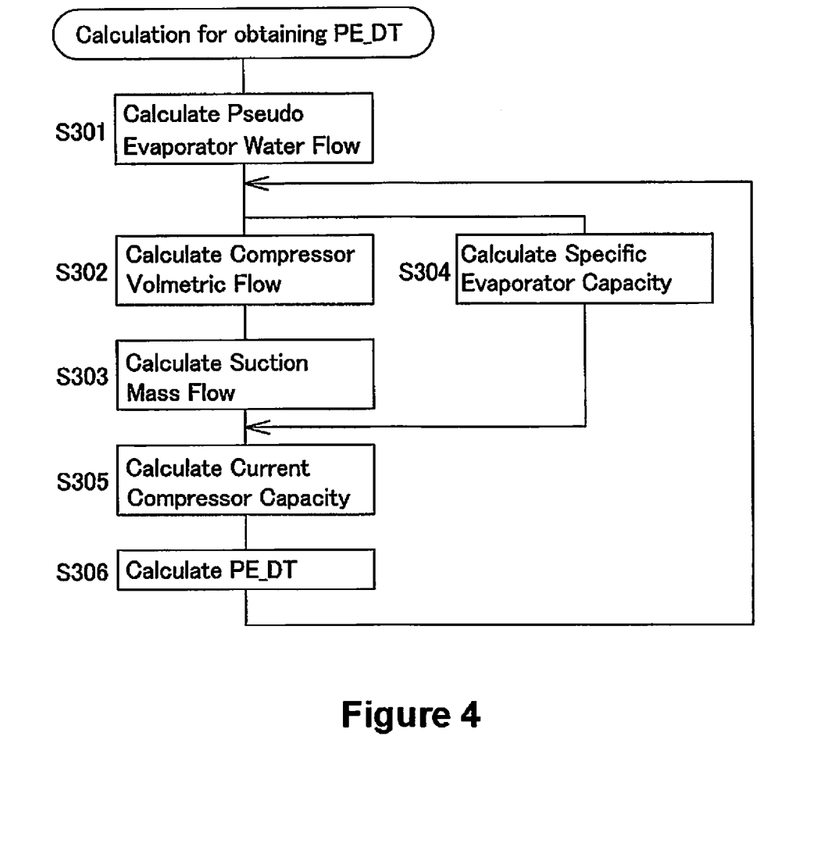
FIG. 4 illustrates a flowchart for PE_DT (pseudo evaporator water delta temperature, pseudo chilled water inlet and outlet temperature difference) calculation processing.

Processing for calculating PE_DT is explained with reference to the flow chart in FIG. 4.

In Step S301, pseudo evaporator water flow (m³/hr) is calculated. The pseudo evaporator water flow is calculated with Equation 3.

Pseudo Evaporator Water Flow (m³/h)=Rating Compressor Capacity*3024 (kcal/h/TR)/Pseudo Rating Water $DT$/Cpw/Dw (Equation 3)

Cpw and Dw in Equation 3 are characteristic values of the fluid. Cpw is a fluid isobaric specific heat and Dw is a fluid density. In Equation 3, rating compressor capacity, pseudo rating water DT, Cpw and Dw are setting values. The unit of the rating compressor capacity is TR (American refrigeration ton). The rating compressor capacity is a value within a range between 200 TR and 2000 TR. Default of the rating compressor capacity is 800 TR. The pseudo rating water DT is a value within a range between 3.0 (deg C.) and 15.0 (deg C.). Default of the pseudo rating water DT is 5.0 (deg C.). Cpw is a value within a range between 0.5 (kcal/kg/deg C.) and 1.5 (kcal/kg/deg C.). Default of Cpw is 1.0 (kcal/kg/deg C.). Dw is a value within a range between 500 (kg/m³) and 1500 (kg/m³). Default of Dw is 1000 (kg/m³). After the pseudo evaporator water flow is calculated, the process proceeds to Step S302 and Step S304.

In Step S302, compressor volumetric flow (m³/min) is calculated. The compressor volumetric flow is calculated with Equation 4

Compressor Volumetric Flow=Rating Volumetric Flow*Coefficient $Fc$*Coefficient $Fd$*Correction Factor with $DDC$*Correction Factor with Shroud Cut Model (Equation 4)

Shroud means an outer shape of the vanes of the impeller in the compressor. Shroud Cut Model is a model in which the capacity is adjusted by lowering the height of the impeller vanes and reducing the cross section area of the gas passage part.

Coefficient Fc in Equation 4 is a function using a compressor rotation speed ratio (% RPM) and the chiller head divided by the rating surge head as variables (Coefficient Fc=function f1 (% RPM, chiller head/rating surge head)). The compressor rotation speed ratio (% RPM) is obtained by dividing the current rotation speed of the compressor by the rating rotation speed of the compressor. Coefficient Fc is equal to the value obtained by dividing the compressor volumetric flow at the current compressor rotation speed ratio (% RPM) under a condition of the opening degree of the inlet guide vane 43 is 100%, by the rated volumetric flow. Coefficient Fd in Equation 4 is a function using the opening degree (%) of the inlet guide vane 43 and the chiller head divided by the current surge head as variables (Fd=function f2 (% IGV, chiller head/current surge head)). Coefficient Fd is equal to the value obtained by dividing the compressor volumetric flow at the current compressor rotation speed ratio (% RPM) and the current opening degree of the inlet guide vane 43, by the compressor volumetric flow at the current compressor rotation speed ratio (% RPM) under a condition of the opening degree of the inlet guide vane 43 is 100%. Correction Factor with DDC in Equation 4 is a correction factor of the volumetric flow, when the opening degree of DDC is less than 100%. After the compressor volumetric flow is calculated, the process proceeds to Step S303.

In Step S303, a suction mass flow (kg/h) is calculated. The suction mass flow is calculated with Equation 5. Suction gas density in Equation 5 is calculated by using the suction pressure and the suction temperature. The suction pressure is obtained by subtracting the calculated suction side pressure loss corresponding to the current compressor volumetric flow from the measured pressure at the evaporator.

Suction Mass Flow=Compressor Volumetric Flow (m³/min)*60 (min/h)*Suction Gas Density (kg/m³) (Equation 5)

In Step S304, specific evaporator capacity (kJ/kg) is calculated. The specific evaporator capacity is calculated with Equation 6.

Specific Evaporator Capacity=Suction Gas Enthalpy ($Hsg$) (kJ/kg)−Enthalpy of Saturated Liquid at Economizer ($Hel$) (kJ/kg) (Equation 6)

In Step S305, the current compressor capacity (TR) is calculated based on the calculation results in Step S303 and Step S304. The current compressor capacity is calculated with Equation 7.

Current Compressor Capacity ($TR$)=Suction Mass Flow (kg/h)*Specific Evaporator Capacity (kJ/kg)/4.1868 (kJ/kcal)/3024 (kcal/h/TR) (Equation 7)

In Step S306, the pseudo evaporator water delta temperature (PE_DT, the pseudo chilled water inlet and outlet temperature difference) is calculated based on the calculation result in Step S305. The pseudo evaporator water delta temperature (PE_DT, the pseudo chilled water inlet and outlet temperature difference) is calculated with Equation 8. Cpw and Dw in Equation 8 are identical with Cpw and Dw in Equation 3. The pseudo evaporator water flow in Equation 8 is design flow rate and set value.

Pseudo Evaporator Water Delta Temperature ($PE\_DT$)=Current Compressor Capacity ($TR$)*3024 (kcal/h/TR)/Pseudo Evaporator Water Flow (m³/h)/$Cpw$(kcal/kg/deg C.)/$Dw$(kg/m³)  (Equation 8)

After the pseudo evaporator water delta temperature (PE_DT) is calculated in Step S306, the process is returned to Step S302 and Step S304 and the pseudo evaporator water delta temperature (PE_DT) are calculated repeatedly.

Generally, the evaporator refrigerant circulation amount can be calculated by using Equation 5 whether the operation cycle is single-stage or 2-stage. But, in the case that especially the operation cycle is two stage cycle having a economizer (refer to FIG. 3A) and the operating degree of the high stage expansion valve is calculated, (M+m) calculated with Equation 9, which is obtained by transforming the Equation 1, is preferably used as the evaporator refrigerant circulation amount. Control with high precision can be achieved by using the evaporator refrigerant circulation amount modified with the amount of gas supplied from the economizer 30 to the high stage compression mechanism ($2^{nd}$ compression mechanism 42b) of the centrifugal compressor 22.

$(M+m)=\{1+(Hcl-Hel)/(Heg-Hcl)\}*M$  (Equation 9)

Also, $\{1+(Hcl-Hel)/(Heg-Hcl)\}$ in Equation 1 indicates a ratio of refrigerant circulation amounts between the high stage side and the low stage side. Therefore, when an electric $2^{nd}$ expansion valve 32 is also used for the low stage side as shown in FIG. 1A, it is better to coordinate the opening degrees of the high stage side and the low stage side by taking this into consideration.

In Table 2, one case where the target opening degree of the expansion valve is calculated by Equation 2 with C_DT or E_DT and the other case where the target opening degree of the expansion valve is calculated by Equation 2 with PE_DT are compared.

because it is not influenced by actual water amount and temperature difference. Thus it is easy to optimize performance according to the compressor. Also, the control response is improved as compared to the prior art because there is no water temperature detection step. Coordination between the compressor and the expansion valve during the load fluctuation period and the transition period is improved, and thus, controllability of water temperature is improved.

The pseudo water delta temperature (PE_DT) is obtained by calculating Equation 8 (Pseudo Evaporator Water Delta Temperature (PE_DT)=Current Compressor Capacity*3024/Pseudo Evaporator Water Flow/Cpw/Dw).

The compressor capacity correspond well to the chiller capacity and the actual evaporator water delta temperature (E_DT) is obtained by calculating Equation 10

$E\_DT$=Current Compressor Capacity*3024/Current Actual Evaporator Water Flow/$Cpw/Dw$.  (Equation 10)

Thus the current actual evaporator water flow can be estimated by comparing E_DT with PE_DT. This makes us enable to alarm to the user when the water flow rate at the evaporator may be out of range of usage of the unit by monitoring E_DT and PE_DT.

Figure 5:
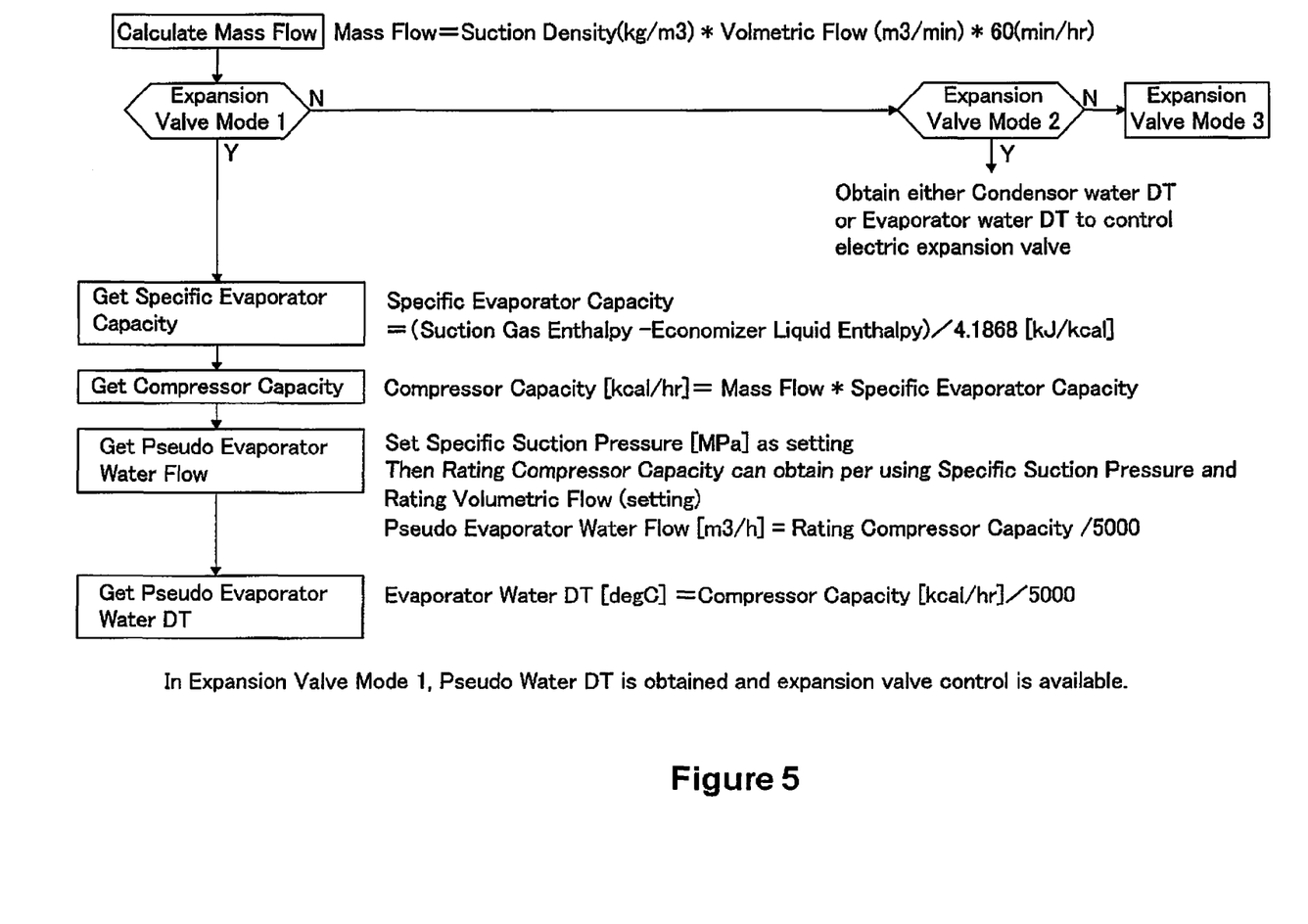
FIG. 5 illustrates expansion valve control.

FIG. 5 illustrates expansion valve control.

Additional Explanations/Advantages

The present disclosure relates to a refrigerant control method, for example, in a turbo chiller or the like, and a detector for a flow rate of fluid (water, brine, or the like).

In recent years, in order to meet a need for energy saving, comprehensive system efficiency has been required including not only operation efficiency of a refrigerating machine itself but also peripheral equipment such as water pump and the like.

For example, when the flow rate of water is decreased corresponding to the load status by inverter control of a water pump so as to respond to decrease in load at actual facilities of the user, large power reduction can be achieved in the entire system depending on the operation conditions of a chiller.

Further, it can be expected that the system efficiency will be improved more by making not only the flow rate of chilled water (brine) but also the flow rate of cooling water variable. In such a case, it is important to maintain the

TABLE 2

|  | Influenced by the user's specification and actual operating condition | Compatibility with water side variable flow amount control | Gain, Offset, etc. Parameter | Control responsiveness of the expansion valve |
| --- | --- | --- | --- | --- |
| C_DT or E_DT | Yes | Difficult | Adjusted for the user's specification on a case-by-case basis | Relatively Slow<br>1. User's load variation<br>2. Compressor capacity control<br>3. Water temperature variation<br>4. Expansion valve opening degree change |
| PE_DT | No | Possible | Uniformed design is possible. Standardization of the expansion valve opening degree calculation | Fast<br>1 User's load variation<br>2. Compressor capacity control<br>3. Expansion valve opening degree change |

When C_DT or E_DT is used, even when the same chiller is used, different Gain/Offset parameters for calculating the opening degree of the expansion valve are required if the water temperature difference required by the user is different. By introducing PE_DT, standardization of the expansion valve opening degree and the parameters is possible operation efficiency of the chiller even when the flow rate of water is made variable. Load control of the chiller is performed mainly through capacity control of a compressor, or particularly in the case of a turbo compressor, through the rotation number of the compressor and a capacity control mechanism on a suction side or a discharge side. Here, in order to maintain the efficiency of the chiller, it is important to control the flow rate of the refrigerant in response to the operation load of the compressor.

In a high capacity chiller such as a turbo chiller, a flooded type evaporator or a falling film type evaporator is generally used. In such a case, according to a conventional technique, the flow rate is controlled by adjusting an expansion mechanism while detecting a liquid surface level in the evaporator. However, since the liquid surface level in the evaporator does not always correspond to the load level, there is a problem that the operation efficiency of the chiller is deteriorated especially when the load is low.

Also, a method for adjusting the opening degree of an expansion valve while monitoring the suction superheat degree has been conventionally known. However, the suction superheat degree often becomes a temperature very close to zero irrespective of change in load in the case of an evaporator of the flooded type or the falling film type in which a refrigerant is flowed outside the heat transfer tube, and therefore, control of the refrigerant in response to the load level is difficult.

In order to solve this problem, a method for monitoring the difference between the chilled water outlet temperature and the saturation temperature corresponding to the suction pressure has been proposed, for example, in U.S. Pat. No. 6,318,101. However, the performance of the evaporator will be deteriorated with impure substances (scale) adhering to the inside of the heat transfer tube as time passes, and the suction pressure will be decreased accordingly. Specifically, since the difference between the chilled water outlet temperature and the saturation temperature corresponding to the suction pressure increases as time passes, this value should not be used as an index of the operation load from a medium and long term viewpoint.

As a method for detecting change in the load on the chiller (especially when the flow rate of water is variable) with higher accuracy, U.S. Pat. No. 8,132,420 has disclosed that the operation load is calculated from characteristics of the expansion valve with regard to a differential pressure and a flow rate of a refrigerant, enthalpy difference in the evaporator, and an actual temperature difference between inlet and outlet of the chilled water. However, there are cases in which the state of the refrigerant becomes a gas-liquid two-phase flow at an upstream side of the expansion valve depending on the operation conditions, and in such a case, the flow ratio between liquid and gas cannot be measured at the upstream side of the expansion valve. Thus, there is inevitably an error present in the flow rate of the refrigerant in the expansion valve obtained from the differential pressure, which results in a quite large influence on the accuracy of the calculated operation load of the chiller.

Additionally, in the case where flow rates of chilled water and cooling water is variably controlled, it is necessary to be controlled within the range of a prescribed design amount and velocity of water in order to protect the chiller and assure long-term reliability of the heat transfer tube.

Conventionally, it is well-known that a state outside the range of the water amount is detected by attaching a pressure switch, a paddle switch, or the like, as an alternative for an expensive flow monitor.

However, in any case, a special device needs to be attached and a contact point with a chiller controller needs to be added, which causes problems that management becomes difficult and the cost increases in a case where a required number of the contact points of the controller is limited.

The object of the present disclosure is to provide a chiller that achieves stable and efficient operation even in a case where the flow rates of cooling water and chilled water are made variable at the same time, and has an inexpensive quantitative detector for a case where the variable flow rates of cooling water and chilled water reach abnormal levels.

In order to achieve the above-described object, in a refrigerating apparatus according to this disclosure, an opening degree of an expansion mechanism is calculated by using compressor capacity as one of indices of change in load. The compressor capacity is obtained from factors which are a current rotation number of the compressor, an opening degree of a capacity control mechanism, and a divergence rate of a current operation head from a surge region.

With this arrangement, the flow rate of a refrigerant is controlled by the expansion mechanism while directly detecting operation load on the compressor controlled by detected operation load on the chiller (chilled water outlet temperature). Therefore, it is possible to exclude the influence of incongruity between the operation load on the compressor and the control of the flow rate of a refrigerant by the expansion mechanism, and achieve efficiency of the chiller.

A specific calculation method is described in this disclosure. With this method, since the measured inlet and outlet temperature difference of chilled water or cooling water is not directly required for calculating the load on the chiller, the chiller efficiency can be achieved by appropriately coordinating the load on the compressor and the opening degree of the expansion mechanism even in a case where either or both of the flow rates of chilled water or cooling water are made variable.

Also, with this method, calculation of the opening degree of the expansion mechanism can be standardized using standard design refrigerating capacity and standard design inlet and outlet temperature difference without depending on a design flow rate or inlet and outlet temperature difference different for each user. Therefore, regardless of operation conditions of each user, equipment can be placed in an operation state in accordance with the intention of the design constantly.

Further, it can be expected that more desirable operation conditions is achieved by correcting the opening degree, which is based on calculation of the opening degree of the expansion mechanism according to the present disclosure, with the suction superheat degree and the supercooling degree as appropriate.

In this case, the expansion mechanism can be controlled so as to prevent a gas-liquid two-phase flow state at upstream side of the expansion valve, which might occur depending on the operation conditions, as much as possible, and thus, it can be expected that the efficiency of the chiller will be improved under the conditions of partial load.

Further, it can be expected that more desirable operation conditions can be achieved by appropriately correcting a gain value in the attached formula (Equation 2) with differential pressure information such as differential pressure of the condenser and the evaporator or the condenser and the economizer, and the ratio of current operation load to rated load, on the basis of calculation of the opening degree of the expansion mechanism according to the present disclosure.

In the attached document, the case of a hydrocooling chiller is shown as an example. However, since the amount of fluid or the temperature (difference) does not matter in calculation of the opening degree of the expansion mechanism according to the present disclosure, the present disclosure can be applied to a brine chiller, a heat recovery chiller, and the like.

According to the present method, since calculation of the opening degree of the expansion mechanism is not directly affected by the dirt state of the heat transfer tube of the heat exchanger, desirable operation conditions of the chiller can be maintained over the medium and long term.

According to the present refrigerating apparatus and control device, the ratio of the pseudo chilled water inlet and outlet temperature difference (PE_DT) derived from the compressor capacity and the actual measurement chilled water inlet and outlet temperature difference corresponds to the ratio of the standard design flow rate of chilled water and the current actual estimation flow rate of chilled water of the chiller. Therefore, by monitoring this, it is possible to estimate whether the actual flow rate of chilled water is within the range of use of the design flow rate of chilled water. When the estimation flow rate is outside the range of use, the reliability of the heat transfer tube of the heat exchanger can be increased by conducting appropriate processes such as stopping the chiller, issuing notification to the user, or outputting a request signal to increase or decrease the water amount from the chiller. Also, since these are conducted by internal computing of the controller, there is no need to attach a sensor, a switch, and the like, additionally for measurement of the flow rate. As a result, there is no need to add such devices or a controller to connect such devices therewith, and thus, the cost increase can be prevented.

Incidentally, the monitoring of a flow rate in accordance with the above-described method can also be applied to cooling water from a similar viewpoint.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A refrigerating apparatus comprising:
   a centrifugal compressor;
   a capacity control mechanism configured to control the capacity of the compressor by changing an opening degree of the capacity control mechanism;
   an expansion mechanism configured to reduce a pressure of a refrigerant; and
   a controller configured to calculate an opening degree of the expansion mechanism using compressor capacity as one of a plurality of indices of change in load, with the compressor capacity being obtained from a current rotation number of the compressor, an opening degree of the capacity control mechanism, and a divergence rate of a current operation head from a surge region.

2. The refrigerating apparatus according to claim 1, wherein
   the refrigerating apparatus has a two-stage refrigeration cycle,
   the expansion mechanism includes a high stage side expansion mechanism, and
   the controller is configured to calculate the opening degree of the high stage side expansion mechanism.

3. The refrigerating apparatus according to claim 2, wherein the expansion mechanism further includes a low stage side expansion mechanism, and a mechanical float valve is used in the low stage side expansion mechanism.

4. The refrigerating apparatus according to claim 2, wherein
   the expansion mechanism further includes a low stage side expansion mechanism,
   the low stage side expansion mechanism is controlled by electrical operation, and
   the controller is configured to coordinate an opening degree of the low stage side expansion mechanism with a calculated opening degree of the high stage side expansion mechanism.

5. The refrigerating apparatus according to claim 1, wherein
   the refrigerating apparatus has a two-stage refrigeration cycle with an economizer,
   the expansion mechanism includes a high stage side expansion mechanism, and
   the controller is configured to correct an actual control opening degree of the high stage side expansion mechanism based on a liquid-gas ratio by weight in the economizer obtained from
      enthalpy of liquid at an outlet of a condenser of the refrigerating apparatus and saturated enthalpies of liquid and gas at the economizer.

6. The refrigerating apparatus according to claim 1, wherein
the refrigerating apparatus has a two-stage refrigeration cycle with an economizer,
the controller is configured to calculate the opening degree of the expansion mechanism using pseudo chilled water inlet and outlet temperature difference, with the pseudo chilled water inlet and outlet temperature difference being obtained from the compressor capacity, evaporator capacity acquired from enthalpy information of an evaporator of the refrigerating apparatus and the economizer, and a standard design flow rate of chilled water supplied to the evaporator.

7. A refrigerating apparatus comprising:
a centrifugal compressor;
a capacity control mechanism configured to control the capacity of the compressor by changing an opening degree of the capacity control mechanism;
an expansion mechanism configured to reduce a pressure of a refrigerant;
an evaporator, a refrigerant decompressed by the expansion mechanism and a chilled water performing heat exchange therebetween in the evaporator; and
a controller configured to estimate a current actual flow rate of chilled water by comparing pseudo chilled water inlet and outlet temperature difference with measured chilled water inlet and outlet temperature difference in actual operation, the pseudo chilled water inlet and outlet temperature difference being obtained from
compressor capacity obtained based on a current rotation number of the compressor and an opening degree of the capacity control mechanism,
evaporator capacity obtained by inlet and outlet refrigerant circuit enthalpy difference of the evaporator, and
a standard design flow rate of chilled water supplied to the evaporator.

8. The refrigerating apparatus according to claim 7, wherein
the controller is configured to stop the refrigerating apparatus, issue an alarm, or request an increment or decrement of a water amount when the estimated actual flow rate of chilled water is outside a design acceptable flow rate range of chilled water.

9. A control device adapted for a refrigerating machine having a centrifugal compressor, a capacity control mechanism configured to control the capacity of the compressor by changing an opening degree of the capacity control mechanism, and an expansion mechanism configured to reduce a pressure of a refrigerant, the control device comprising:
a processing unit configured to calculate an opening degree of the expansion mechanism using compressor capacity as one of a plurality of indices of change in load, with the compressor capacity being obtained from a current rotation number of the compressor, an opening degree of the capacity control mechanism, and a divergence rate of a current operation head from a surge region.

10. The control device according to claim 9, wherein
the refrigeration machine has a two-stage refrigeration cycle,
the expansion mechanism includes a high stage side expansion mechanism, and
the processing unit is configured to calculate the opening degree of the high stage side expansion mechanism.

11. The control device according to claim 10, wherein
the expansion mechanism further includes a low stage side expansion mechanism,
the low stage side expansion mechanism is controlled by electrical operation, and
the processing unit is configured to coordinate an opening degree of the low stage side expansion mechanism with a calculated opening degree of the high stage side expansion mechanism.

12. The control device according to claim 9, wherein
the refrigerating machine has a two-stage refrigeration cycle with an economizer,
the expansion mechanism includes a high stage side expansion mechanism, and
the processing unit is configured to correct an actual control opening degree of the high stage side expansion mechanism based on a liquid-gas ratio by weight in the economizer obtained from
enthalpy of liquid at an outlet of a condenser of the refrigerating machine and
saturated enthalpies of liquid and gas at the economizer.

13. The control device according to claim 9, wherein
the refrigerating machine has a two-stage refrigeration cycle with an economizer,
the processing unit is configured to calculate the opening degree of the expansion mechanism using pseudo chilled water inlet and outlet temperature difference, with the pseudo chilled water inlet and outlet temperature difference being obtained from the compressor capacity, evaporator capacity acquired from enthalpy information of an evaporator of the refrigerating machine and the economizer, and a standard design flow rate of chilled water supplied to the evaporator.

14. A control device adapted for a refrigerating machine having a centrifugal compressor, a capacity control mechanism configured to control the capacity of the compressor by changing an opening degree of the capacity control mechanism, an expansion mechanism configured to reduce a pressure of a refrigerant, and an evaporator, a refrigerant decompressed by the expansion mechanism and a chilled water performing heat exchange therebetween in the evaporator, the control device comprising:
a processing unit configured to estimate a current actual flow rate of chilled water by comparing pseudo chilled water inlet and outlet temperature difference with measured chilled water inlet and outlet temperature difference in actual operation, the pseudo chilled water inlet and outlet temperature difference being obtained from
compressor capacity obtained based on a current rotation number of the compressor, and an opening degree of the capacity control mechanism,
evaporator capacity obtained by inlet and outlet refrigerant circuit enthalpy difference of the evaporator, and
a standard design flow rate of chilled water supplied to the evaporator.

15. The control device according to claim 14, wherein
the processing unit is configured to stop the refrigerating machine, issue an alarm, or request an increment or decrement of a water amount when the estimated actual flow rate of chilled water is outside a design acceptable flow rate range of chilled water.

* * * * *